United States Patent [19]

Schriever

[11] 4,436,268

[45] Mar. 13, 1984

[54] SELF-ALIGNING LOAD LEVELING DEVICE

[76] Inventor: Frederick G. Schriever, 64 Claireview, Grosse Pointe Shores, Mich. 48236

[21] Appl. No.: 285,368

[22] Filed: Jul. 20, 1981

[51] Int. Cl.³ .............................................. F16M 11/24
[52] U.S. Cl. ................................. 248/188.3; 248/188.2
[58] Field of Search ............... 248/188.3, 188.2, 188.4, 248/188.1, 644, 657, 678

[56] References Cited

U.S. PATENT DOCUMENTS

| 156,927 | 11/1974 | Jewell . | |
|---|---|---|---|
| 1,987,726 | 1/1935 | Wilkerson et al. . | |
| 2,819,037 | 1/1958 | Wilkin | 248/188.2 X |
| 3,306,562 | 2/1967 | Bellefleur | 248/188.2 X |
| 3,325,145 | 6/1967 | Bertuch . | |
| 4,114,845 | 9/1978 | Wiesenberger | 248/188.2 X |

FOREIGN PATENT DOCUMENTS

| 937134 | 12/1955 | Fed. Rep. of Germany . | |
|---|---|---|---|
| 1063426 | 1/1960 | Fed. Rep. of Germany . | |
| 1142469 | 1/1963 | Fed. Rep. of Germany . | |
| 1241202 | 5/1967 | Fed. Rep. of Germany . | |
| 2424516 | 6/1975 | Fed. Rep. of Germany | 248/188.2 |
| 2448451 | 4/1976 | Fed. Rep. of Germany | 248/188.4 |
| 403405 | 11/1965 | Switzerland | 248/188.2 |
| 438853 | 6/1967 | Switzerland | 248/188.2 |
| 720246 | 3/1980 | U.S.S.R. | 248/188.2 |

Primary Examiner—Ramon S. Britts
Assistant Examiner—Sarah A. Lechok
Attorney, Agent, or Firm—Burton, Parker & Schramm

[57] ABSTRACT

A leveling device for mounting and leveling heavy loads independent of the inclination of the floor upon which the device is supported utilizes a plurality of wedges disposed between a base member and a load supporting member in combination with mated spherical surfaces to provide two self-adjusting features which obviate concern for non-level mounting surfaces or misaligned loads.

13 Claims, 9 Drawing Figures

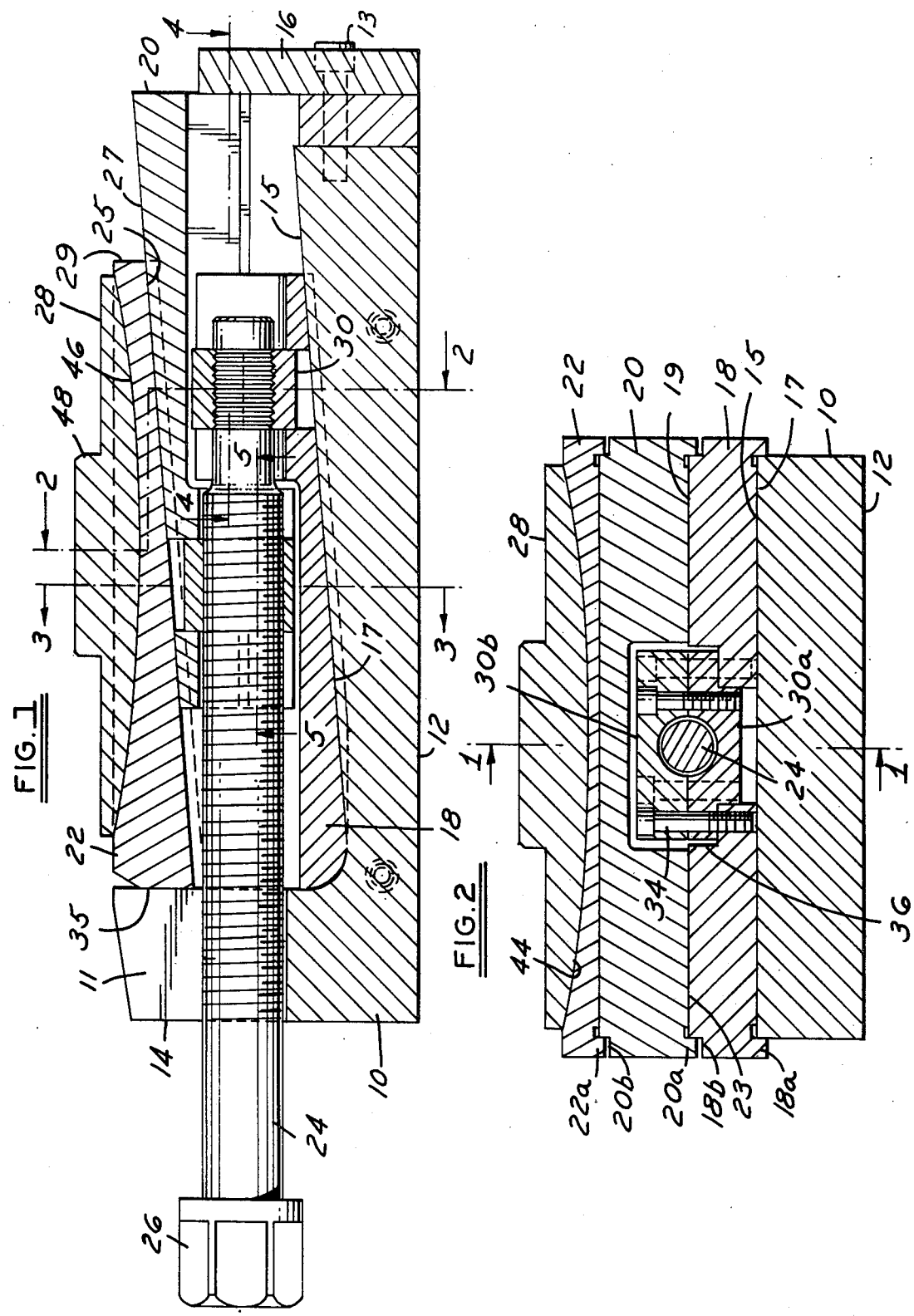

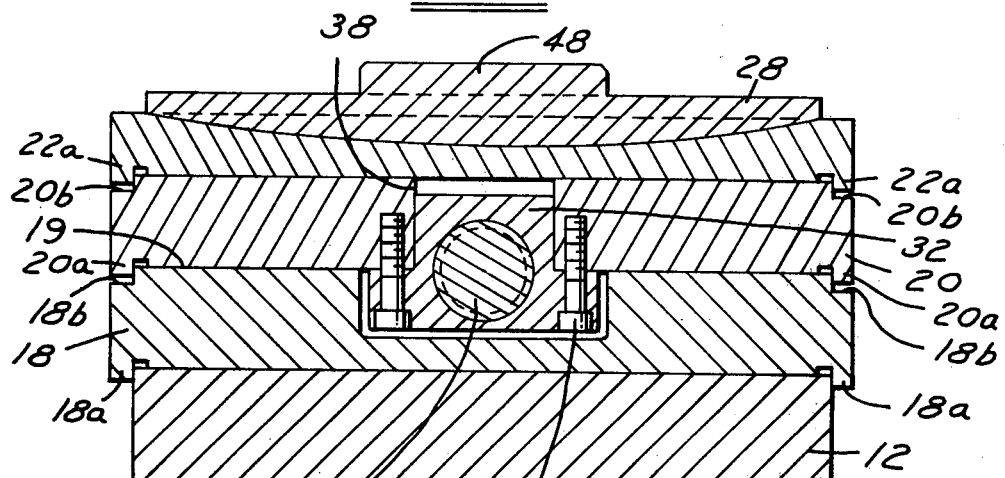
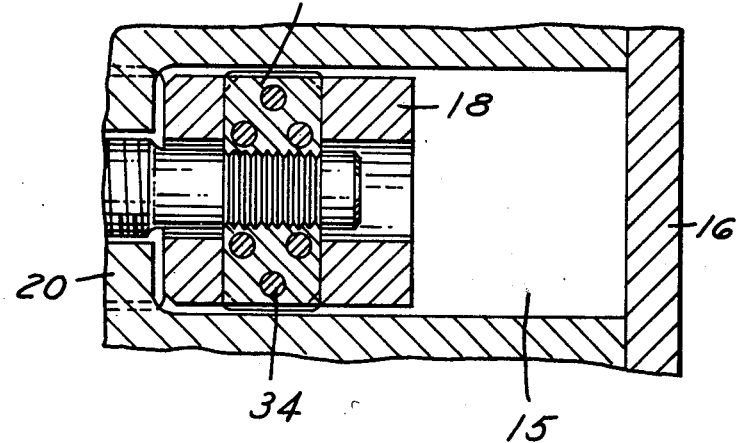
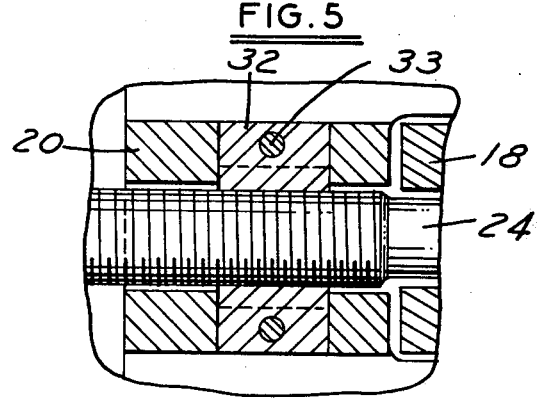

SELF-ALIGNING LOAD LEVELING DEVICE

DESCRIPTION

BACKGROUND OF THE INVENTION

Leveling devices in the past have been employed for adjustably supporting loads of varying sizes and weights. The level conditions of machine tools, production equipment, and, more recently, nuclear reactors, have presented a critical need for preciseness. Although several levelers are usually used to obtain this precise condition, full compensation for uneven or non-level supporting planes has been difficult, if possible, to attain. The result of a non-level condition will result in load shifting and an accompanying impairment of operation or other serious and costly consequences.

Previous attempts to compensate for supporting plane unevenness and slope have included the combination of wedges and spherical surfaces, as taught in U.S. Pat. No. 3,306,562, but these earlier devices had a limited range of adjustability and stability. Usually the supporting plane upon which the leveling device was to rest required substantial preparation to approach near levelness.

SUMMARY OF THE INVENTION

An important object of this invention is to provide an improved leveling device designed and constructed so that true level alignment is achieved and maintained while avoiding severe stresses without considerable preparation of the load supporting plane.

Another important object of the invention is to provide an improved leveling device which is self-aligning in any direction for automatically compensating for surface slope.

A further object of the invention is to provide an improved leveling device for carrying heavy loads which is designed in a novel manner to compensate for support plane unevenness or slope without concern for the direction of such unevenness or slope.

Another important object of the invention is to provide an improved leveling device for heavy loads which distributes the load weight over the whole supporting area and minimizes shifting tendencies of the load usually caused by vibration.

To achieve these objectives, the leveling device herein described combines a containing base member, a mechanical means for adjustment of relative position between two wedges and the base, an automatically adjusting third wedge, and a self-aligning load support. While the mechanical shifting of the two wedges accomplishes vertical adjustment, the automatic and self-aligning features of the device are designed to maintain structural strength and stability while compensating for unevenness and lack of level in the support plane.

Other objects and advantages of this invention will be apparent from the following specifications, appended claims, and accompanying drawings.

BRIEF DESCRIPTION OF DRAWINGS

FIG. 1 is a vertical cross-section of a leveling device embodying the invention;

FIG. 2 is a cross-sectional view taken on the line 2—2 of FIG. 1;

FIG. 3 is a cross-sectional view taken on the line 3—3 of FIG. 1;

FIG. 4 is a horizontal cross-sectional view taken on the line 4—4 of FIG. 1;

FIG. 5 is a horizontal cross-sectional view taken on the line 5—5 of FIG. 1;

DESCRIPTION OF PREFERRED EMBODIMENT

Figure 6:
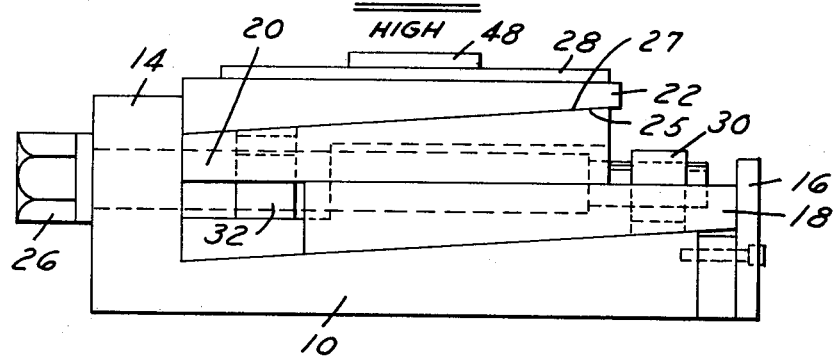
FIG. 6 is a schematic view similar to FIG. 1 showing the relative position of its various parts when the device is at its maximum vertical adjustment.
Figure 7:
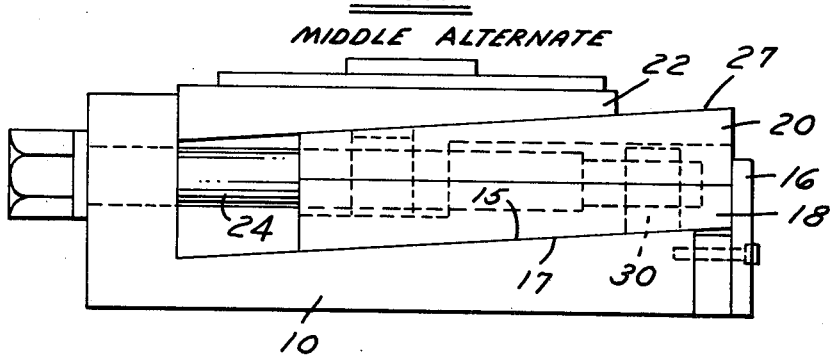
FIG. 7 is similar to FIG. 6 but showing the position of the various parts at the alternative midpoint of vertical adjustment.

With particular reference to FIGS. 1 to 3, the preferred embodiment of the invention disclosed therein comprises a base member 10 of general U-shape formation, including a bottom portion 12 and two opposite end wall portions 14 and 16; end wall 14 being an integral part of base 10 and end wall 16 being a separate piece bolted to base 10 by bolts 13, only one of which is shown. The cradle-like appearance of base member 10 forms a partial housing for a pair of superimposed wedge-shaped members, the upper one being indicated at 20, the lower one being indicated at 18. The lower wedge 18 is seated in the cradle of base 10 on the upwardly facing inclined surface 15. The lower wedge has a downwardly facing inclined surface 17 which slidably engages the surface 15. The lower wedge has a generally horizontally extending upwardly facing surface 19 which slidably engages the complementary horizontal surface 23 of the upper wedge. Both wedges are permitted relative longitudinal sliding movement in the direction of one or the other of the end walls 14 and 16. The two wedges are of equal size and of a length less than the distance between the confronting surfaces of the end walls, and both serve to function as sliding and lifting wedges.

A third wedge, load supporting member 22, is a portion of the load engaging means and rests upon the upper wedge 20. This third wedge has an inclined downwardly facing surface 25 which is slidably supported on a complementary upwardly facing inclined surface 27 of the upper wedge 20. The third wedge 22 functions as a lifting wedge. The three wedges are designed to nest within the end walls of the base 10.

Torque means is provided for slidably adjusting the wedges. Such means comprises an adjusting screw 24 operatively engaging the lower and upper wedges 18 and 20, and having polygonally shaped head 26 which is engageable by a tool for turning purposes. To prevent sidewise movement, each wedge has downwardly extending tongues 18a, 20a, and 22a which overlap the member below as shown in FIGS. 2 and 3. For this purpose, wedges 18 and 20 are provided with grooves 18b and 20b into which the complementary tongues are received.

The wedges 18, 20 and 22 have relatively wide dimensions, as shown in the FIGS. 2 and 3, and the engagement of their respective interfaces, as well as the engagement of the interface of wedge 18 and base 10, is maintained against lateral movement as above described. The action of raising and lowering a load to a desired level line is achieved by converting horizontal motion into vertical motion and particularly by the interaction of the inclined planes of wedge members 18, 20 and 22. More specifically, the shank of screw 24 is slidably received in an upwardly opening slot 11 of frame wall 14. Torque applied to screw head 26 causes rotation of screw 24 within the operatively engaged portions of wedges 18 and 20. This rotation is converted into longitudinal forces acting upon the wedges and a resultant relative longitudinal shift occurs. The load supporting member 22 adjusts itself on the upwardly inclined surface 27 of upper wedge 20 so as to maintain contact with the end wall 14, thus, as the lower and upper wedges are moved longitudinally relative to each other by the rotation of the adjusting screw in either direction, the load supporting member is moved vertically by the interaction of the inclined wedging surfaces.

Relative longitudinal movement of the upper and lower wedges is accomplished by an idler coupling 30 connected to the lower wedge 18 and an adjusting nut 32 connected to the upper wedge 20. The idler coupling comprises a pair of U-shaped internally radially grooved members 30a and 30b encircling and meshing with a similarly radially grooved portion of screw 24, said U-shaped members joined to each other and attached to lower wedge 18 by bolts 34, FIG. 2. Although the meshed radial grooves of said screw and U-shaped members are designed without pitch to allow rotation of said screw in said coupling and not cause longitudinal movement of these members relative to each other, a longitudinal movement of said screw or wedge will force concurrent longitudinal movement in the coupled members.

The adjusting nut 32 is attached to upper wedge 20 by bolts 33, FIG. 3. The nut has a thread pitch which, when the nut is threadedly engaged with a similarly pitched portion of screw 24 and the screw is rotated, will cause a longitudinal movement of nut and screw relative to each other. The idler coupling 30 is attached to a longitudinally extending channel 36 in lower wedge 18, FIG. 2, and, similarly, the adjusting nut 32 is attached to a longitudinally extending channel 38 in upper wedge 20, FIG. 3. FIGS. 2 through 5 illustrate that channels 36 and 38 provide clearance for fore and aft movement of idler 30 and nut 32. Thus, with the connection of screw 24 to nut 32 and idler 30 as described, rotation of said screw will cause longitudinal relative movement between wedges 18 and 20.

Figure 8:
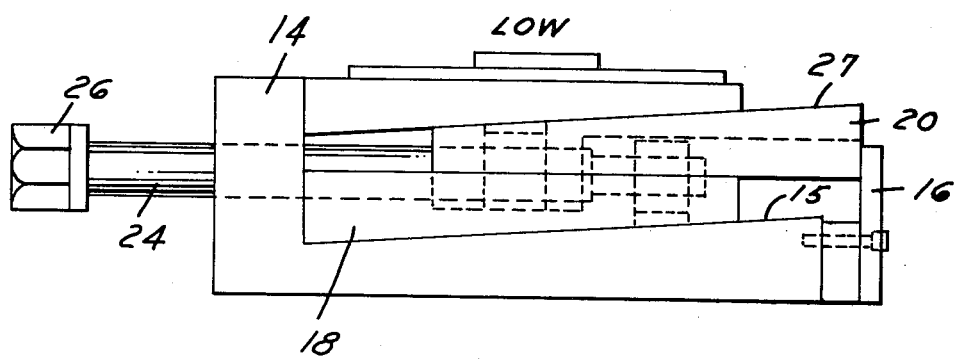
FIG. 8 is similar to FIG. 6 but showing the position of the various parts at the lowest vertical adjustment.
Figure 9:
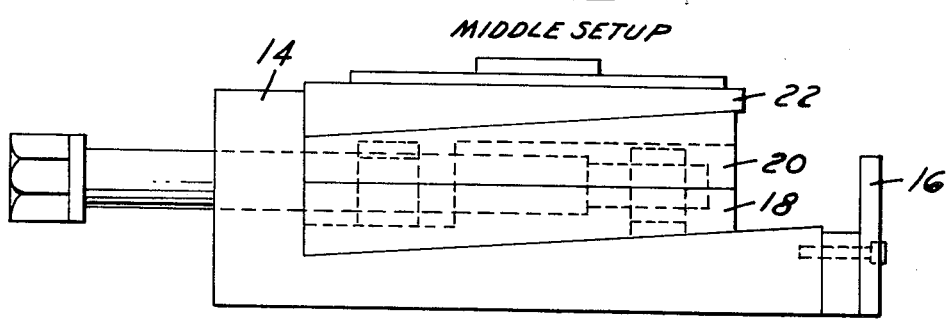
FIG. 9 is a schematic view similar to FIG. 6 showing the position of the various parts at the preferred midpoint of vertical adjustment.

Reference to FIGS. 6 through 9 will illustrate the novel combination which converts rotational movement of the adjusting screw 24 into longitudinal movement of the lower and upper wedges 18 and 20 with the ultimate vertical movement of the load supporting member 22. FIG. 6 depicts the leveling device at its maximum vertical extension with upper wedge 20 in contact with base end wall 14 and lower wedge 18 in contact with the opposite base end wall 16. Rotation of adjusting screw 24 will cause nut 32 and its attached upper wedge 20 to move away from base end wall 14. The force of the load support member 22 on inclined interface of surfaces 25 and 27 will cause the load support member 22 to continuously adjust itself to maintain contact with end wall 14 as wedge 20 moves toward end wall 16. Idler coupling 30 allows the rotation of screw 24 without disturbance of wedge 18. As wedge 20 moves to contact wall 16, the retreat of its wedge shape from beneath support member 22 allows member 22 to lower until the device reaches the status depicted by FIG. 7. At this point, wedge 20 is restrained by wall 16. Since continued rotation of screw 24 forces continued relative longitudinal movement between adjusting nut 32 and said screw, and since said nut is attached to wedge 20 and wedge 20 is now constrained by end wall 16, further rotation of said screw will cause the screw to retreat from the now stationary nut and attached wedge 20. The retreat of screw 24 is evident by the retreat of screw head 26 from end wall 14, FIG. 8. As said screw retreats, it draws the idler 30 and its attached lower wedge 18 towards wall 14. The effect of the retreat of wedge 18 down the interface of surfaces 15 and 17 is to cause a lowering of upper wedge 20 and the resultant decrease in height of the load support member 22 until the status of FIG. 8 is attained. This is the lowest vertical height of the device. Because surfaces 15 and 27 are parallel, it is obvious that a reverse direction of rotation of screw 24 will cause the wedges to retreat from wall 16 by the principles discussed above and effect the status depicted by FIG. 9.

The invention provides compensation for an unevenness or slant of the supporting surface or floor upon which the leveling device is set. This is achieved by "floatingly" supporting the load for universal movement in any direction. For accomplishing this purpose, the device is provided with an alignment compensating means having mated relatively shiftable spherical surfaces. More specifically, and with particular reference to FIGS. 1 and 2, the aligning means comprises a load engaging member 28 having a downwardly directed convex spherical surface 44 and the top side of the load supporting member 22 is provided with a mating concave spherical recess 46 of the same radius of curvature as the surface 44.

In plan view the load engaging or alignment compensating member 28, is of circular outline. It is provided with a central upwardly projecting boss 48 for engagement with the supporting structure of the load which the leveler will support. When laid on a floor, the load leveling base member 10 will assume whatever inclination the floor has. The alignment compensating member 28 is free to slide over the spherical surface 46 of the load supporting member 22 in any direction as the heavy load carried thereby is vertically adjusted and leveled. Any slant in the floor within the capability of the leveling assembly can be readily compensated for in this manner.

A leveling device constructed in accordance with this invention, in carrying out its function of supporting heavy loads, will spread or distribute the forces of the load equally over the wide surface of the spherical portions 44 and 46, and thereby avoid load concentrations at any low spot or line which might easily cause a fracture of one of the parts of the leveler. No care need be exercised about the direction of floor slant and the disposition of the parts of the leveler with respect thereto. During the operation of vertically adjusting and leveling the load, the base 10 and the wedging members contained therein may be slid and swiveled under the spherical protuberance 44 of the alignment compensating means regardless of the floor slant. Final adjustments of previous levelers could cause the entire leveling device to move to the extreme limits of its self-aligning capability and thus move the load stress to the outer limits of the device. The embodiment of the present invention provides the alignment capabilities of the spherical surfaces 44 and 46 while presenting the novel design feature that allows the load supporting member 22 to maintain its position against end wall 14, thus maintaining the load forces at the center of mass and structural strength of the assembled device. Although the embodiment herein presented places the alignment compensating means on top of the leveling device, it would be obvious to one skilled in the art that such alignment means might also be placed under the base 10 without adverse effect on the other basic features of the device.

In the described embodiment of this invention, horizontal surfaces 12 and 19 are parallel and the angles of the inclined surfaces are equal, making surface 15 parallel to surface 27. This relationship between said surfaces is not necessary for successful employment of the device and other combinations of surface relationships may be employed. However, it has been found that variations of slope in the surfaces will affect the torque requirements necessary for adjustment as well as vary the range of vertical adjustment available to the user. The preferred embodiment of said surface relationships provides a "locking angle" which gives stability to the final adjustment of the device.

While the preferred embodiment of the invention has been described and illustrated, it is to be understood that it is capable of variation and modification without departing from the spirit and scope of the invention.

I claim:

1. A leveling device for supporting heavy loads comprising, in combination:
   a. a base member;
   b. a load supporting member disposed above the base member;
   c. a pair of wedges positioned one above the other and disposed between said members, each wedge slidably engaging one of said members along an inclined interface;
   d. said wedges slidably engaging one another along a non-inclined interface;
   e. means connected to each of said wedges for slidably shifting them along said interface and relative to each other and to said base and load supporting members to thereby vary the height of the load supporting member relative to the base member; and
   f. alignment compensating means for distributing a load evenly over the wedges despite misalignment between the load to be carried and the floor upon which the base may be rested.

2. The invention defined by claim 1 wherein said wedges and base and load supporting members have means extending longitudinally of the inclined surfaces for preventing relative lateral movement therebetween.

3. The invention defined by claim 1 wherein said means for slidably shifting said pair of wedges is an adjusting screw operatively connected to said wedges.

4. The means of claim 3 for slidably shifting the wedges is further defined by:
   a. said screw being engagingly connected to one wedge by an idler coupling; and
   b. said screw being threadingly connected to the other wedge.

5. The invention described in claim 1 wherein the load alignment compensating means comprises, in combination:
   a. one of said members having a concave spherical surface;
   b. an alignment compensation member having a convex spherical surface for mating with the concave surface;
   c. said concave and convex spherical surfaces having the same radius of curvature and said radius being substantially greater than any lateral dimension of the leveling device; and
   d. said spherical surfaces being in aligned load bearing relation with the base and the load supporting members.

6. The invention defined by claim 1 wherein the angle of the inclined surface is in the range of 6° to 14°.

7. The invention as defined in claim 1 wherein there is a means to limit longitudinal movement of said load supporting member relative to said base member.

8. The invention as defined in claim 1 wherein there is a means to limit longitudinal movement of said pair of wedges relative to said base member.

9. The invention as defined in claim 1 wherein there is a means to limit longitudinal movement of said load supporting member and said pair of wedges relative to said base member.

10. The invention defined by claim 1 wherein said means for slidably shifting said pair of wedges is an adjusting screw which has an axis parallel to said non-inclined interface between said wedges.

11. A load leveling device for supporting heavy loads comprising in combination:
    a. a base member having upturned endwall portions at two opposite ends thereof;
    b. a load supporting member disposed above the base member, one edge of which contacts an endwall portion of the base to limit the relative movement therebetween in one longitudinal direction;
    c. a pair of wedges positioned one above the other disposed between said members, each wedge slidably engaging only one adjacent member along an inclined interface, said interfaces being parallel, said wedges cooperating with the upturned endwall portions of the base member to limit the movement of said wedges in the longitudinal direction;
    d. said wedges being themselves slidably engaged along a non-inclined interface;
    e. alignment compensation means for distributing a load evenly over the wedges despite misalignment between the load to be carried and the floor upon which the base may be rested; and
    f. an adjusting screw connected to each of said wedges and having its axis parallel to the non-inclined interface between said wedges for slidably shifting them in the longitudinal direction along said interfaces relative to each other and to said base and load supporting members, to thereby vary the height of the load supporting member relative to the base member.

12. The invention defined by claim 11 wherein said wedges and load supporting members have means extending longitudinally of the inclined surfaces for preventing relative lateral movement therebetween.

13. The invention defined by claim 11 wherein the angle of the inclined surfaces is in the range of 6° to 14° relative to the non-inclined interface.

* * * * *

UNITED STATES PATENT OFFICE
CERTIFICATE OF CORRECTION

Patent No. 4,436,268        Dated March 13, 1984

Inventor(s) Frederick G. Schriever

It is certified that error appears in the above-identified patent and that said Letters Patent are hereby corrected as shown below:

In Claim 1, line 40, change the word "interface" to --- interfaces --- .

Signed and Sealed this

Fourteenth Day of August 1984

|SEAL|

Attest:

Attesting Officer

GERALD J. MOSSINGHOFF

Commissioner of Patents and Trademarks